(12) United States Patent
Krueger et al.

(10) Patent No.: US 10,066,608 B2
(45) Date of Patent: Sep. 4, 2018

(54) METHOD FOR REPAIRING AN ELECTRICAL HEATING ELEMENT OF A WIND TURBINE ROTOR BLADE

(71) Applicant: Nordex Energy GmbH, Hamburg (DE)

(72) Inventors: Bernhard Krueger, Bargteheide (DE); Tobias Ahrens, Dortmund (DE)

(73) Assignee: Nordex Energy GmbH, Hamburg (DE)

( * ) Notice: Subject to any disclaimer, the term of this patent is extended or adjusted under 35 U.S.C. 154(b) by 618 days.

(21) Appl. No.: 14/618,769

(22) Filed: Feb. 10, 2015

(65) Prior Publication Data

US 2015/0283653 A1    Oct. 8, 2015

(30) Foreign Application Priority Data

Apr. 3, 2014    (EP) ..................... 14163425

(51) Int. Cl.
| | |
|---|---|
| F03D 80/50 | (2016.01) |
| F03D 80/40 | (2016.01) |
| F03D 1/06 | (2006.01) |
| B29D 99/00 | (2010.01) |
| B29C 73/10 | (2006.01) |
| B29L 31/08 | (2006.01) |

(52) U.S. Cl.
CPC .............. *F03D 80/50* (2016.05); *B29C 73/10* (2013.01); *B29D 99/0028* (2013.01); *F03D 1/0675* (2013.01); *F03D 80/40* (2016.05); *B29L 2031/085* (2013.01); *F05B 2230/80* (2013.01); *Y02E 10/721* (2013.01); *Y02P 70/523* (2015.11); *Y10T 29/49083* (2015.01)

(58) Field of Classification Search
CPC .......... B23P 6/002; F03D 80/40; F03D 80/50; F03D 1/0675; B29C 73/10; Y10T 29/49083; B29D 99/0028
See application file for complete search history.

(56) References Cited

U.S. PATENT DOCUMENTS

| | | | | |
|---|---|---|---|---|
| 5,605,440 | A | * 2/1997 | Bocoviz | .................. B29C 70/48 244/17.19 |
| 5,958,166 | A | 9/1999 | Walters et al. | |
| 6,145,787 | A | * 11/2000 | Rolls | ..................... B64D 15/12 219/545 |
| 2009/0053406 | A1 | 2/2009 | Ackerman | |
| 2010/0135820 | A1 * | 6/2010 | Olson | ..................... B29C 73/10 416/241 R |
| 2011/0036482 | A1 | 2/2011 | Stenbaek et al. | |
| 2012/0308394 | A1 * | 12/2012 | Gruhn | ..................... B29B 11/16 416/226 |
| 2013/0149153 | A1 * | 6/2013 | Fujioka | .................. H02G 13/00 416/146 R |

* cited by examiner

*Primary Examiner* — Livius R Cazan
(74) *Attorney, Agent, or Firm* — Walter Ottesen, P.A.

(57) ABSTRACT

A method for repairing an electrical heating element of a wind turbine rotor blade has the steps of identifying a region of the heating element that has a defect and applying a thermally conductive repair layer to the identified region. The repair layer is thermally conductive and is electrically insulating at least on an underside facing the defect.

22 Claims, 2 Drawing Sheets

METHOD FOR REPAIRING AN ELECTRICAL HEATING ELEMENT OF A WIND TURBINE ROTOR BLADE

CROSS REFERENCE TO RELATED APPLICATION

This application claims priority of European patent application no. 14163425.3, filed Apr. 3, 2014, the entire content of which is incorporated herein by reference.

FIELD OF THE INVENTION

The invention relates to a method for repairing an electrical heating element of a wind turbine rotor blade.

BACKGROUND OF THE INVENTION

Equipping wind turbine rotor blades with one or more electrical heating elements in order to be able to heat surface regions of the rotor blade is known. In this way, it is possible to counteract icing of the rotor blade, either in that ice accumulation is entirely prevented or ice already adhering to the blade surface is melted. Known electrical heating elements are usually arranged in the region of the profile leading edge and, along a majority of the rotor blade length, on the surface thereof. During operation, they are supplied with an electrical heating current which flows through the heating element for example in the longitudinal or transverse direction. The desired heating action is brought about by the ohmic resistance of the heating element.

For optimal operation of the heating element, uniform heat generation is desired over the entire surface area thereof. This requires an electrical resistance that is uniform over the surface area of the heating element or is adapted to the locally required heat output. Deviations arise in particular in the region of defects of the heating element. These can be brought about by production errors, transportation damage or by mechanical damage during operation of the wind turbine rotor blade. Lightning striking the wind turbine rotor blade in the region of the heating element, or flashovers between the heating element and a lightning conductor can likewise cause defects.

In the region of a defect, the electrical conductivity of the heating element is impaired or entirely interrupted. This results in two undesired effects: in regions of the heating element which are laterally adjacent to the defect with regard to the heating current direction, a greater current density and consequently higher temperatures occur. These regions are also known as hotspots. Moreover, within the defect and upstream or downstream of the latter in the heating current direction, regions with an insufficient temperature occur. These regions are also known as cold spots. Both effects can result in undesired damage. In particular in the region of extensive cold spots, the heating element can under certain circumstances no longer prevent ice accumulation. In the region of the hotspots, it is possible for temperatures which are so high to arise that the laminate, in particular a plastics matrix surrounding the reinforcement fibers, is damaged, and so structural, and under certain circumstances irreparable, damage to the wind turbine rotor blade can occur in the worst-case scenario.

In a known method for repairing electrical heating elements, an attempt is made to restore the original electrical conductivity of the heating element in the region of the defect. To this end, an electrically conductive material, preferably the same material as the one of which the electrical heating element is made, is applied to the heating element in the region of the defect and preferably brought into electrical contact with the heating element in the region of its edges. The establishment of an electrical contact between the heating element and the repair patch requires complicated mechanical preparation of the contact points, this frequently not being feasible at the site of a wind turbine. Independently thereof, it is difficult to restore the original resistance ratios of the heating element. In particular at the electrical contact points, it is possible for regions with a high current density, which can themselves result in hotspots, to occur.

SUMMARY OF THE INVENTION

On this basis, it is an object of the invention to provide a method for repairing an electrical heating element of a wind turbine rotor blade, which is easy to apply and with which damage resulting from a defect can be reliably prevented.

This object is achieved by a method for repairing an electrical heating element of a wind turbine rotor blade having the steps of:
 identifying a region of the heating element that has a defect, and,
 applying a repair layer to the identified region, the repair layer being thermally conductive and being electrically insulating at least on an underside facing the defect.

The electrical heating element can be located on a surface of the wind turbine rotor blade. It is made of a sheetlike material having a defined electrical resistance. The heating element can have a carbon fiber material, in particular a laid fabric made of carbon fibers. The carbon fiber material can be embedded in a plastics matrix, for example by lamination onto a prefabricated wind turbine rotor blade or by embedding the carbon fiber material of the heating element during the production of the wind turbine rotor blade in a production mold, in particular during the production of a rotor blade half-shell in a vacuum infusion process.

In the method according to the invention, a region of the heating element which has a defect to be repaired is initially identified. This can be carried out in particular by simple visual inspection, for example during an inspection for transportation damage or for discoloration of the wind turbine rotor blade in the region of the defect in the event of a lightning strike. Of course, a defect can also be located in any other desired manner, for example from a detectably nonuniform heat output using a thermal imaging camera. The defect can, for example, be a scratch in the surface of the wind turbine rotor blade, the scratch being deep enough that it impairs the electrical conductivity of the heating element. Depending on the cause and severity of the damage, the region of the defect can have dimensions of a few centimeters or more, for example palm-sized.

Once the region of the heating element having the defect has been identified, a repair layer is applied to this region. The repair layer is large enough that it completely covers the defect.

The repair layer can be a homogeneous layer made of a single material or of a uniform material mixture. Alternatively, it can have a number of sublayers or plies. Overall, the repair layer has a high specific thermal conductivity, for example of at least 10 W/m·K or at least 25 W/m·K. The repair layer can be configured as a patch, foil or plate or be applied in the form of a paste, for instance a filling compound.

The repair layer is electrically insulating at least on the underside, such that the electrical conductivity of the heating element is not altered by the repair layer. No electric current flows through the repair layer, and so the electrical output remains substantially unaffected. The effect of the repair according to the invention is thus not that of restoring the conditions of an undamaged heating element with regard to the heating current but rather resides in the temperature-balancing effect of the thermally conductive repair layer. Since the repair layer is arranged in the region of the defect and is insulated electrically but not thermally from the region of the heating element having the defect, a thermal current arises in the repair layer, in particular from the hotspots formed around the defect to the surrounding regions. As a result, the temperature at the hotspots drops, while it increases at the cold spots. Ideally, as a result of this temperature-balancing effect of the repair layer, a substantially uniform surface temperature can be achieved in the region of the defect, although the heating current flow continues to be impaired by the defect.

The result of the repair is a wind turbine rotor blade having an electrical heating element which has a defect, wherein a repair layer, which is electrically insulating at least on an underside facing the defect, is arranged on the electrical heating element in the region of the defect.

In one configuration, the repair layer is made of one ply and has an electrically nonconductive base material which is filled with thermally conductive components. The thermally conductive components can be a functional filler, in particular particles having high thermal conductivity. This allows targeted setting of the desired thermal conductivity and adaptation to other requirements.

In one configuration, the base material is a polymer material. The latter can be additionally reinforced with glass fibers. This ensures high stability. Furthermore, the glass fiber reinforcement can contribute to the desired electrically insulating property of the repair layer, in particular on the underside thereof.

In one configuration, the repair layer includes two plies and the application of the repair layer includes the following steps of:
  applying an electrical insulation ply to the identified region and
  applying a thermally conductive ply to the electrical insulation ply.

The application of the thermally conductive ply can take place in particular following the application of the electrical insulation ply to the identified region. However, it is also possible in principle to combine the insulation ply and the thermally conductive ply with one another prior to application to the heating element and then to apply them to the heating element together. The electrical insulation ply and the thermally conductive ply are fastened permanently to the surface of the wind turbine rotor blade, for example by adhesive bonding. The thermally conductive ply is electrically insulated from the heating element through which current flows by the electrical insulation ply, and so no current flows in the thermally conductive ply.

The thermally conductive ply can be dimensioned such that it completely covers the defect or projects beyond the defect on all sides, for example by 2 cm or more, preferably by 5 cm or more. The thermally conductive ply is smaller than the electrical insulation ply, and so direct contact between the thermally conductive ply and the heating element all over is ruled out. As long as the heating element is covered around the defect by a sufficiently electrically insulating layer, for example an undamaged coating, the thermally conductive layer can also project beyond the edges of the applied electrical insulation ply.

In an embodiment, the thermally conductive ply has a thickness in the range from 0.1 mm to 1 mm. In particular, it can have a thickness in the range from 0.2 mm to 0.5 mm. Tests have shown that when a material having sufficient thermal conductivity is chosen, a sufficient, temperature-balancing effect is achieved in this way. At the same time, the aerodynamic conditions on the wind turbine rotor blade surface are impaired as little as possible.

In an embodiment, the thermally conductive ply has a graphite foil. This material, which is available for example under the trade name Sigraflex, has high thermal conductivity and heat resistance. On account of the high thermal conductivity, it is possible to work with particularly small layer thicknesses. At the same time, the graphite foil is sufficiently flexible in order to be able to be applied without problems to curved surface regions of the wind turbine rotor blade.

In an embodiment, the thermally conductive ply has a metal foil. For example, a foil or a sheet of copper or aluminum or an alloy containing one of these metals can be used. In this way, too, a sufficient temperature-balancing effect can be achieved with small layer thicknesses.

In an embodiment, the method has the following step of: applying a cover layer to the repair layer.

The cover layer can protect the repair layer and/or the thermally conductive ply from damaging external influences. Furthermore, the cover layer can fix the repair layer and/or the thermally conductive ply to the surface of the wind turbine rotor blade.

In an embodiment, the cover layer projects beyond lateral edges of the repair layer. In this case, the cover layer can optimally protect the repair layer, in particular the thermally conductive ply and/or the insulation ply, and fix it to the surface of the wind turbine rotor blade.

In an embodiment, the insulation ply and/or the cover layer has a ply of a glass fiber material. This can be in particular a laid fabric, woven fabric or braid made of glass fibers. The glass fiber material can be embedded in a plastics matrix and be fastened to the wind turbine rotor blade surface in particular by lamination. Such a ply of a glass fiber material has a high electrical insulation effect and at the same time sufficient thermal conductivity.

In an embodiment, the insulation ply and/or the cover layer has a thickness of less than 0.5 mm. The electrical insulation effect of the insulation ply and the protective and fastening effect of the cover layer are already sufficient at this layer thickness. At the same time, the aerodynamic conditions at the wind turbine rotor blade surface are impaired as little as possible.

In an embodiment, the repair layer has a thickness in the range from 0.1 mm to 1 mm. This is also aerodynamically advantageous.

In an embodiment, the method has the following further step of:
  restoring the electrical conductivity of the heating element in the region of the defect prior to the application of the repair layer.

As a result of this measure, first of all the original heating action of the heating element can be at least partially restored in the region of the defect. This can be necessary in particular in the case of extensive defects. As a result of the additionally applied thermally conductive ply, any remaining irregularities in heat generation can be compensated such that a largely uniform surface temperature is achieved overall.

In an embodiment, in order to restore the electrical conductivity, a patch made of a carbon fiber material or of a metal foil is applied in the region of the defect and is brought into electrical contact with the heating element. In particular, the patch can be made of the same material as the heating element to be repaired. However, a different electrically conductive material can also be used, in particular one having an electrical resistance that corresponds substantially to that of the electrical heating element.

In one configuration, in order to restore the electrical conductivity, an electrically conductive adhesive is applied to the defect. Suitable for this purpose is for example an epoxy resin which is mixed with electrically conductive particles, in particular with silver particles. Such adhesives are also known as conductive epoxies.

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
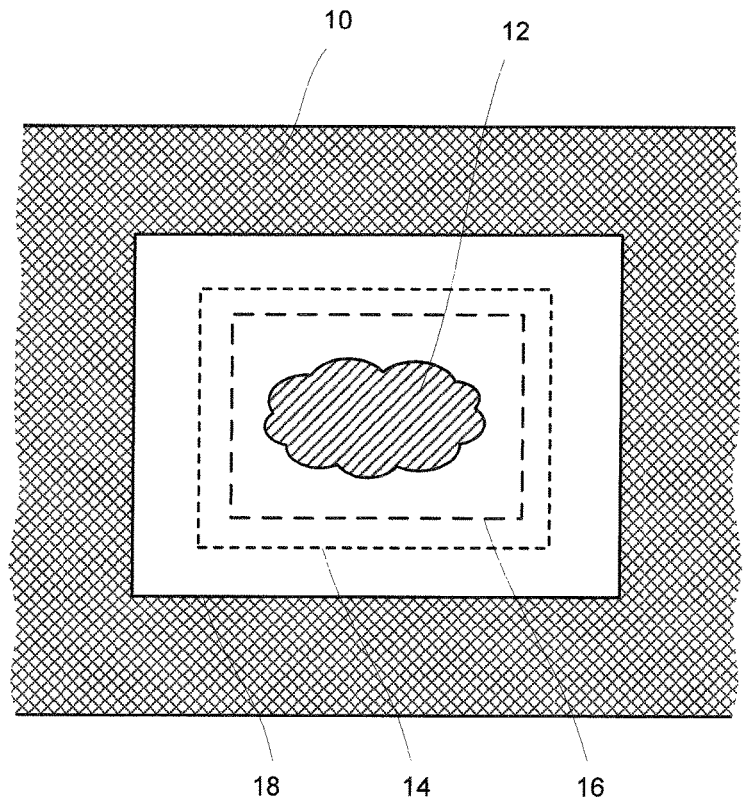
FIG. 1 is a schematic illustration of a surface region of a wind turbine rotor blade which has been repaired by way of the method according to the invention.

The surface region, shown in FIG. 1, of the wind turbine rotor blade is covered entirely with an electrical heating element 10 which is made of a laid fabric made of carbon fibers that are embedded in a plastics matrix. The electrical heating element 10 has a defect 12 that is illustrated in a hatched manner. In this region, the electrical conductivity of the electrical heating element 10 is impaired, that is at least partially interrupted.

Once the defect 12 was identified, an electrical insulation ply 14 was applied in the region of the defect. In the example, a single ply of a glass fiber material was laminated on, that is placed on the surface of the wind turbine rotor blade and subsequently impregnated with a curing plastics material. A glass fiber material preimpregnated with a curing plastics material, frequently known as a prepreg, could have been used just as well.

The electrical insulation ply 14 is much larger than the defect 12 and its edges project beyond the defect 12 on all sides.

A thermally conductive ply 16 was applied to the electrical insulation ply 14. The thermally conductive ply 16 in the example is made of a graphite foil having a thickness of 0.25 mm. The thermally conductive ply 16 is smaller than the electrical insulation ply 14 and completely covers the region of the defect 12, wherein it projects beyond the edges of the defect 12 by a few centimeters on all sides.

The entire arrangement made of the electrical insulation ply 14 and the thermally conductive ply 16 is covered by a cover layer 18 which likewise is made of an individual ply of a laminated-on glass fiber material. The cover layer 18 projects beyond the thermally conductive ply 16 and the electrical insulation ply 14 on all sides. The insulation ply 14 and the thermally conductive ply 16 together form a repair layer which is thermally conductive and is electrically insulating on the underside.

Figure 2:
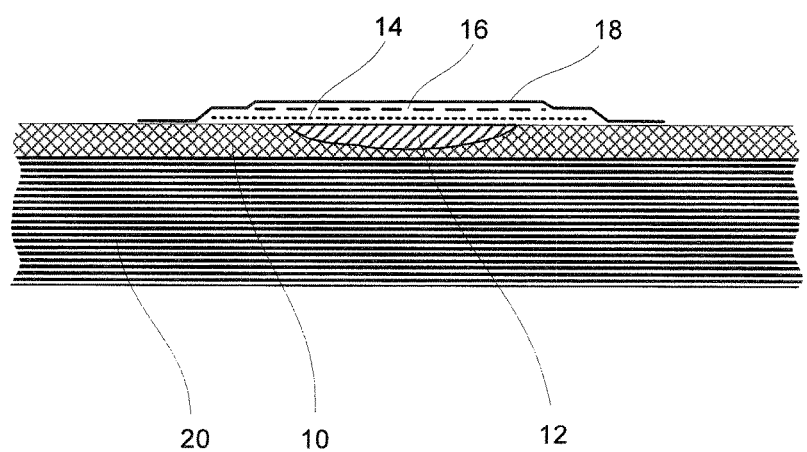
FIG. 2 shows a cross-section through the surface region, shown in FIG. 1, of the wind turbine rotor blade; and, FIG. 3 shows a cross-section through a surface region of a different wind turbine rotor blade repaired by way of the method according to the invention.

The arrangement of these elements with respect to one another is even clearer in the cross-sectional illustration in FIG. 2. The region hatched with horizontal lines represents a rotor blade wall 20 made in particular of a fiber composite material. Located on the latter is the heating element 10. The defect 12 only partially penetrates the electrical heating element 10. Deeper damage, in particular damage which completely interrupts the heating element 10 in the region of the defect, is likewise possible. The electrical insulation ply 14 is first of all applied to the surface of the heating element 10 in the region of the defect 12. Arranged above the insulation ply 14 is the thermally conductive ply 16. Located at the very top is the cover layer 18.

Figure 3:
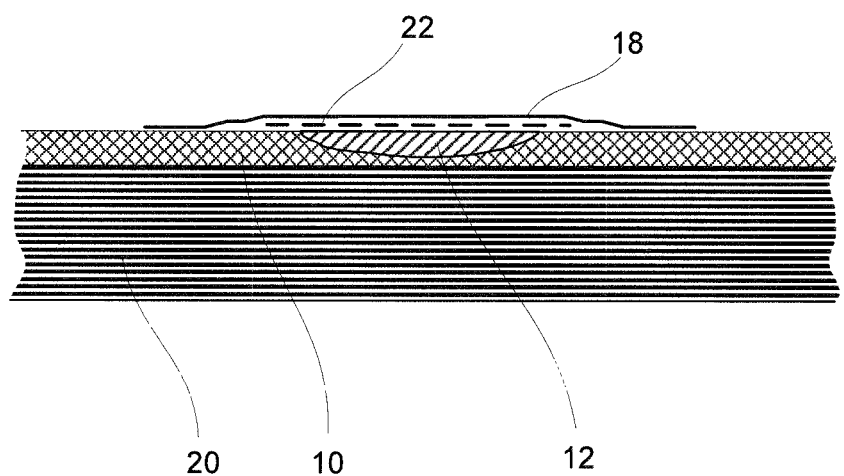

FIG. 3 shows an alternative according to the invention. The elements corresponding to the solution in FIGS. 1 and 2 are provided with the same reference signs and are not explained again. The repair layer 22 is made of a polymer material filled with thermally conductive particles. As a result, the homogeneously constructed repair layer 22 is electrically insulating and yet highly thermally conductive.

It is understood that the foregoing description is that of the preferred embodiments of the invention and that various changes and modifications may be made thereto without departing from the spirit and scope of the invention as defined in the appended claims.

LIST OF REFERENCE SIGNS USED

10 Heating element
12 Defect
14 Electrical insulation ply
16 Thermally conductive ply
18 Cover layer
20 Rotor blade wall
22 Repair layer

What is claimed is:

1. A method for repairing an electrical heating element of a wind turbine rotor blade, the method comprising the steps of:
    identifying a region of the heating element that has a defect;
    providing a thermally conductive repair layer having an underside and a specific thermal conductivity of at least 10 W/m·K; and,
    applying said repair layer to the identified region so as to cause said underside thereof to face said defect with said repair layer being electrically insulating at least on said underside thereof facing the defect.

2. The method of claim 1, wherein the repair layer is made of one ply and includes an electrically nonconductive base material filled with thermally conductive components.

3. The method of claim 2, wherein said base material is a polymer material.

4. The method of claim 1, further comprising the step of:
    applying a cover layer to the repair layer.

5. The method of claim 4, wherein said cover layer projects beyond the lateral edges of the repair layer.

6. The method of claim 4, wherein said repair layer includes an electrically insulating ply; and, at least one of said electrically insulating ply and said cover layer includes a layer of glass fiber material.

7. The method of claim 6, wherein at least one of said electrically insulating ply and said cover layer has a thickness of less than 0.5 mm.

8. The method of claim 1, wherein said repair layer has a thickness lying in a range of 0.1 mm to 1 mm.

9. A method for repairing an electrical heating element of a wind turbine rotor blade, the method comprising the steps of:

identifying a region of the heating element that has a defect;

providing a thermally conductive repair layer having an underside;

applying said repair layer to the identified region so as to cause said underside thereof to face said defect with said repair layer being electrically insulating at least on said underside thereof facing the defect; and, restoring the electrical conductivity of the heating element in the region of the defect prior to the application of the repair layer.

10. The method of claim 9, wherein said restoring the electrical conductivity of the heating element in the region of the defect comprises the further steps of:

applying a patch made of one of a carbon fiber material and a metal foil in the region of the defect; and, bringing the patch into electrical contact with the heating element.

11. The method of claim 9, wherein said restoring of the electrical conductivity of the heating element in the region of the defect comprises the step of applying an electrically conductive adhesive to the defect.

12. A method for repairing an electrical heating element of a wind turbine rotor blade, the method comprising the steps of:

identifying a region of the heating element that has a defect;

applying an electrically insulating ply having an underside to the identified region so as to cause said underside thereof to face said defect;

applying a thermally conductive layer onto said electrically insulating ply, wherein said electrically insulating ply and said thermally conductive layer conjointly define a repair layer; and, restoring the electrical conductivity of the heating element in the region of the defect prior to the application of the repair layer.

13. The method of claim 12, wherein the thermally conductive layer has a thickness lying in a range of 0.1 mm to 1 mm.

14. The method of claim 12, wherein said thermally conductive layer includes a graphite foil.

15. The method of claim 12, wherein said thermally conductive layer includes a metallic foil.

16. The method of claim 12, the method further comprising the step of:

applying a cover layer to the repair layer.

17. The method of claim 16, wherein said cover layer projects beyond the lateral edges of the repair layer.

18. The method of claim 16, wherein at least one of said electrical insulating ply and said cover layer includes a ply of a glass fiber material.

19. The method of claim 16, wherein at least one of said electrical insulating ply and said cover layer has a thickness of less than 0.5 mm.

20. The method of claim 12, wherein said repair layer has a thickness lying in a range of 0.1 mm to 1 mm.

21. The method of claim 12, wherein said restoring the electrical conductivity of the heating element in the region of the defect comprises the steps of:

applying a patch made of one of a carbon fiber material and a metal foil in the region of the defect; and, bringing the patch into electrical contact with the heating element.

22. The method of claim 12, wherein said restoring of the electrical conductivity of the heating element in the region of the defect comprises the step of applying an electrically conductive adhesive to the defect.

* * * * *